Patented Jan. 11, 1927.

1,613,620

UNITED STATES PATENT OFFICE.

ROY E. NEIDIG, OF MOSCOW, IDAHO.

CLEANING COMPOSITION FOR TYPE AND THE LIKE.

No Drawing.   Application filed December 2, 1925.   Serial No. 72,728.

This invention relates to improvements in cleaning compositions for type and the like, and more particularly a composition for cleaning typewriter and other kinds of type, jewelry, and any other article or material having a surface of small indentations or projections and which heretofore have been cleaned by means of a brush, or with a liquid preparation containing a cleaning agent or solvent.

The object of the invention is to provide a cleaning preparation which will bring about a new method of removing dirt and foreign matter from surfaces such as type, namely, by adhesion rather than by rubbing or wiping with a cloth saturated with a solvent.

A further object of the invention is to provide a cleaning composition having somewhat the consistency of kneaded rubber, but differing essentially therefrom in that the cleaning is accomplished by pressing the material against the surface or face of the type to be cleaned, with the result that a clear impression is made in the contacting surface of the composition, and when removed brings with it all the dirt, dried ink or foreign matter that is lodged in the small indentations or crevices in the surface. Such a composition is clean and stainless, depending on its adhesive properties to accomplish the intended results, and hence is readily distinguished from erasive materials which depend on rubbing or friction. Moreover, the composition is so compounded as to prevent its sticking to the surface being cleaned, but simply to remove and absorb the dirt, leaving the surface bright and clean.

In disclosing the nature of the compound it is to be borne in mind that as in other chemically and physically incorporated mixtures, each ingredient may have numerous substitutes which differ slightly in their chemical and physical properties but produce the same general type of reaction or product when brought together.

For this reason I prefer at the outset to discuss the character of the composition in terms of classes of ingredients rather than species, and then to give an example of a composition that has been wholly satisfactory and perhaps preferable as a commercial product.

Following this procedure, therefore, the base or basis of this composition is the resulting product formed from the incorporation with an inherent adhesive substance, such as crude rubber, of certain water insoluble soaps such as palmitates, oleates, stearates, or resinates of the various metal bases commonly included among the insoluble soaps, to-wit, aluminum, magnesium, calcium, etc. Included in the class with crude rubber as an adhesive are its related compounds, such as balata or gutta percha gums.

Incorporated with the adhesive and insoluble soap are certain oils calculated to produce various degrees of softness and adhesiveness, namely, mineral or animal oils or non-oxidizing vegetable oils as the softener, and rosin oil to produce the desired property of stickiness or tackiness. To this product is added various ingredients which serve as a filler to give body and reduce or temper the stickiness of the material. Such ingredients are talc, soapstone, mica, magnesium carbonate, zinc oxide, zinc carbonate, lithopone or calcium carbonate. Practically all carbonates, silicates and many oxides can be used, together with various pigments to give color or weight to the product. The consistency of the product is manifestly determined by the proportion of the several ingredients present. For general use it has a soft and pliable consistency, and can readily be worked or kneaded between the fingers. It follows also that its consistency may be varied to suit different needs.

Referring now to a concrete example of a composition containing specific ingredients selected from several classes or groups of substances already mentioned, I find as a suitable adhesive crude rubber gum; as the preferred insoluble soaps I have selected aluminum and calcium palmitates; as a suitable oil for solvent and softening purposes, I find that any mineral oil, such as light, medium or heavy paraffine oils, and commonly known as lubricating oils, are satisfactory; and as a substance to increase the tackiness or adhesiveness, I have selected rosin oil as the most suitable oil to use, but other oils having like properties might equally well be used.

As to the ingredients added to give the material body and stiffness, and to reduce the stickiness to just the right amount to produce the proper adhesiveness, I have found that many substances are suitable for the purpose, and therefore I have little or no preference between the carbonates of various metals, such as magnesium, zinc and calcium and their oxides, and such silicates as talc, soapstone or mica, although I prefer to use a combination of one or more of these carbonates and silicates, as the filling substance. As a final ingredient of the composition is added certain pigments to produce the proper colors. Manifestly the coloring of the composition does not affect its physical properties.

The preparation of the composition is a matter of mixing the several ingredients in the required proportions and by suitable means for the purpose. The rubber gum is preferably softened by running the same through rollers, whereupon the soap, oils, and inert materials, together with the desired pigments or colors are then added in the amounts hereinafter prescribed, and within limits governed by the character of the product desired and the use to which it is to be put.

Having described the constituents of the composition (possible as well preferred), I will first give the variable proportions of the basic ingredients as they would be used, such proportions serving as a general guide for those desiring to make use of the invention:

| | Per cent. |
|---|---|
| Rubber gum | from 5 to 20 |
| Insoluble soap | from 15 to 40 |
| Filler | from 40 to 75 |
| Oil | from 15 to 20 |
| Rosin oil | from 8 to 15 |

In addition to the foregoing I will also give a formula which I have found to be workable for general use:

| | Per cent. |
|---|---|
| River Pará gum | 10 |
| Calcium and/or aluminum palmitates | 40 |
| Calcium and/or magnesium carbonates | 20 |
| Mineral oil | 20 |
| Rosin oil | 10 |
| | 100 |

Slight variations may be made from these percentages without materially affecting the character and properties of the composition. No particular amount of pigment is specified, since this may be varied considerably with the color desired, in fact, the pigment may be omitted entirely.

The material when properly mixed is of sufficient body to clearly take very sharply defined impressions. For instance, with typewriter type, the impressions are an exact reproduction of the type. The adhesiveness of the material is just sufficient to withdraw from the type or projection all dirt and foreign materials without leaving any of the material on the type. By kneading the material in the fingers as it is used, the dirt is distributed throughout the mass, and as a result can be used many times before it becomes so saturated as to be unusable.

Among the advantages of the use of such a composition is its cleanliness of operation, as compared with the common practice of using a brush and alcohol, gasoline or other solvent, with the attendant possibility of spattering and soiling the hands and clothing of the operator. Moreover, it obviates the usual trouble caused in cleaning typewriters, that of rubbing the type sideways with a brush which tends to bend them out of alignment. With the present cleaner, the material is pressed firmly against the type, which in turn are held firmly against their supports, and thus are always in the proper alignment.

Although I have disclosed a preferred embodiment of the invention, it is to be understood that I do not wish to be limited to any specific materials to be cleaned or to any specific ingredients except in so far as heretofore suggested and more specifically pointed out in the appended claims.

I claim as my invention:

1. A plastic non-erasing cleaning composition for the purpose described, consisting of a mixture of rubber gum, a water insoluble soap, a non-oxidizing oil, a mineral filling substance and rosin oil.

2. A plastic non-erasing cleaning composition for the purpose described, consisting of a mixture of rubber gum, a water insoluble soap, mineral oil, a mineral filler and rosin oil.

3. A plastic non-erasing cleaning composition for the purpose described, consisting of a mixture of rubber gum, a water insoluble soap, mineral oil, a filler composed of metallic carbonates and silicates, and rosin oil.

4. A plastic non-erasing cleaning composition for the purpose described, consisting of a mixture of rubber gum, a water insoluble soap compounded of calcium and aluminum palmitates, a mineral filler, a mineral oil, and rosin oil.

5. A plastic non-erasing cleaning composition for the purpose described, consisting of a mixture of from 5% to 20% of rubber gum, from 15% to 40% of water insoluble soap, from 40% to 75% of a mineral filler, from 15% to 20% of mineral oil, and from 8% to 15% of a rosin oil.

6. A plastic non-erasing cleaning composition for the purpose described, consisting of a mixture of from 5% to 20% of rubber gum, from 15% to 40% of water insoluble soap, from 40% to 75% of a mineral filler, from 15% to 20% of miner oil, and from 8% to 15% of rosin oil.

7. A plastic non-erasing cleaning composition for the purpose described, consisting of substantially 10% of rubber gum, 40% of water insoluble soap, 20% of a mineral filler, 20% of mineral oil, and 10% of rosin oil.

8. A plastic non-erasing cleaning composition for the purpose described, consisting of substantially 10% of rubber gum, 40% of calcium and aluminum palmitates, 20% of a mineral filler, 20% of mineral oil, and 10% of rosin oil.

Signed at Plankinton, S. D., this 28th day of November, 1925.

ROY E. NEIDIG.

of substantially 10% of rubber gum, 40% of water insoluble soap, 20% of a mineral filler, 20% of mineral oil, and 10% of rosin oil.

8. A plastic non-erasing cleaning composition for the purpose described, consisting of substantially 10% of rubber gum, 40% of calcium and aluminum palmitates, 20% of a mineral filler, 20% of mineral oil, and 10% of rosin oil.

Signed at Plankinton, S. D., this 28th day of November, 1925.

ROY E. NEIDIG.

CERTIFICATE OF CORRECTION.

Patent No. 1,613,620.            Granted January 11, 1927, to

RAY E. NEIDIG.

It is hereby certified that the name of the patentee in the above numbered patent is erroneously written and printed as Roy E. Neidig whereas said name should have been written and printed as Ray E. Neidig; and that the said Letters Patent should be read with this correction therein that the same may conform to the record of the case in the Patent Office.

Signed and sealed this 22nd day of March, A. D. 1927.

M. J. Moore,

Seal.            Acting Commissioner of Patents.

CERTIFICATE OF CORRECTION.

Patent No. 1,613,620.                        Granted January 11, 1927, to

RAY E. NEIDIG.

It is hereby certified that the name of the patentee in the above numbered patent is erroneously written and printed as Roy E. Neidig whereas said name should have been written and printed as Ray E. Neidig; and that the said Letters Patent should be read with this correction therein that the same may conform to the record of the case in the Patent Office.

Signed and sealed this 22nd day of March, A. D. 1927.

Seal.
                                                     M. J. Moore,
                                      Acting Commissioner of Patents.